United States Patent
Barrett

(10) Patent No.: US 9,830,582 B1
(45) Date of Patent: Nov. 28, 2017

(54) SYSTEM, COMPUTER READABLE MEDIUM, AND METHOD FOR AUTHORIZING PURCHASE USING ON-DEMAND PREPAID CARD

(75) Inventor: David M. Barrett, San Francisco, CA (US)

(73) Assignee: Expensify, Inc., San Francisco, CA (US)

( * ) Notice: Subject to any disclaimer, the term of this patent is extended or adjusted under 35 U.S.C. 154(b) by 0 days.

(21) Appl. No.: 12/193,590

(22) Filed: Aug. 18, 2008

Related U.S. Application Data

(60) Provisional application No. 60/956,691, filed on Aug. 18, 2007.

(51) Int. Cl.
G06Q 20/00 (2012.01)
G06Q 20/20 (2012.01)

(52) U.S. Cl.
CPC .................................. G06Q 20/20 (2013.01)

(58) Field of Classification Search
None
See application file for complete search history.

(56) References Cited

U.S. PATENT DOCUMENTS

| | | | | |
|---|---|---|---|---|
| 5,578,808 | A * | 11/1996 | Taylor | 235/380 |
| 6,018,735 | A | 1/2000 | Hunter | |
| 6,065,675 | A * | 5/2000 | Teicher | 235/380 |
| 6,473,500 | B1 * | 10/2002 | Risafi et al. | 379/144.01 |
| 6,615,190 | B1 * | 9/2003 | Slater | 705/41 |
| 7,104,443 | B1 | 9/2006 | Paul et al. | |
| 7,127,426 | B1 | 10/2006 | Coyle | |
| 7,249,092 | B2 * | 7/2007 | Dunn et al. | 705/38 |
| 7,252,223 | B2 * | 8/2007 | Schofield | 235/379 |
| 7,401,731 | B1 * | 7/2008 | Pletz et al. | 235/380 |
| 7,475,808 | B1 * | 1/2009 | Bishop | 235/379 |
| 7,571,142 | B1 * | 8/2009 | Flitcroft et al. | 705/44 |
| 2003/0222136 | A1 * | 12/2003 | Bolle et al. | 235/379 |
| 2004/0122685 | A1 | 6/2004 | Bunce | |
| 2005/0043999 | A1 | 2/2005 | Ji et al. | |
| 2005/0091153 | A1 * | 4/2005 | Monk | 705/39 |
| 2005/0182711 | A1 * | 8/2005 | Pulkkinen et al. | 705/39 |
| 2006/0023248 | A1 | 2/2006 | Reese et al. | |
| 2006/0069642 | A1 * | 3/2006 | Doran et al. | 705/39 |
| 2006/0120519 | A1 * | 6/2006 | Tamari et al. | 379/114.2 |
| 2006/0155641 | A1 * | 7/2006 | Postrel | 705/39 |
| 2006/0218024 | A1 | 9/2006 | Lulla | |
| 2006/0230004 | A1 | 10/2006 | Handley | |
| 2007/0250441 | A1 * | 10/2007 | Paulsen et al. | 705/39 |
| 2007/0255650 | A1 | 11/2007 | Destrempes et al. | |

(Continued)

OTHER PUBLICATIONS

Non-Final Office Action dated Oct. 4, 2012 in U.S. Appl. No. 13/027,067.

(Continued)

Primary Examiner — Fateh M Obaid
(74) Attorney, Agent, or Firm — Mahamedi IP Law LLP

(57) ABSTRACT

A system, computer readable medium, and method of receiving a primary authorization request at a first authorization switch using a prepaid card that lacks adequate funds in the prepaid account to cover the requested purchase amount, and initiating a secondary authorization request using a funding account identifier associated with a funding account that does contain adequate funds to cover the requested purchase amount.

8 Claims, 5 Drawing Sheets

(56) References Cited

U.S. PATENT DOCUMENTS

| | | |
|---|---|---|
| 2008/0017703 A1 | 1/2008 | Lu et al. |
| 2008/0040261 A1 | 2/2008 | Nix et al. |
| 2008/0040274 A1 | 2/2008 | Uzo |
| 2008/0103972 A1* | 5/2008 | Lanc .............................. 705/44 |
| 2008/0177649 A1 | 7/2008 | Heywood |
| 2009/0228380 A1 | 9/2009 | Evanitsky |
| 2009/0249194 A1 | 10/2009 | Day |
| 2009/0271265 A1 | 10/2009 | Lay et al. |
| 2012/0265625 A1 | 10/2012 | Pletz et al. |
| 2013/0198081 A1 | 8/2013 | Royyuru et al. |

OTHER PUBLICATIONS

Final Office Action dated Jun. 4, 2013 in U.S. Appl. No. 13/027,067.

* cited by examiner

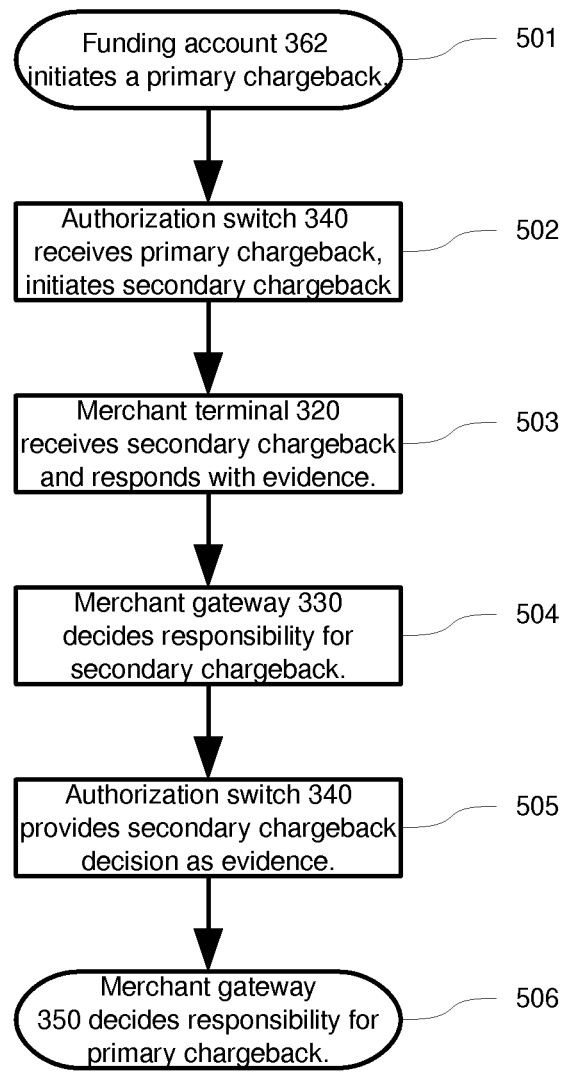

SYSTEM, COMPUTER READABLE MEDIUM, AND METHOD FOR AUTHORIZING PURCHASE USING ON-DEMAND PREPAID CARD

CROSS-REFERENCE TO RELATED APPLICATIONS

This application claims the benefit of U.S. Provisional Patent Application Ser. No. 60/956,691, filed Aug. 18, 2007, in the United States Patent and Trademark Office, the disclosure of which is incorporated herein in its entirety by reference.

BACKGROUND OF THE INVENTION

Field of the Invention

This application relates to a system, computer readable medium, and method for transaction authorization, specifically with respect to financial networks and prepaid electronic payment cards.

Description of the Related Art

Individuals and businesses are increasingly turning to prepaid cards as a reliable means to enable cardholders to make electronic and in-person purchases without the inconvenience of cash or the risk of credit. Prepaid cards broadly fall into two categories: "closed loop" cards that are tied to a particular merchant (Sears™, Starbucks™, etc) for loyalty or incentive purposes, and "open loop" cards that are branded with the logo of a major network (Visa™, MasterCard™, Discover™, etc) and usable at any merchant that accepts that logo.

The most notable form of prepaid card—for both open and closed-loop cards—is the "gift card". A gift card is a consumer product where one individual "loads" funds onto the card and then gives the card to someone as a gift. The recipient then uses this card in lieu of cash to either purchase from a given merchant (in the case of a closed-loop card), or anywhere the card's logo is accepted (open-loop card).

Another form of prepaid card is the "expense card"—typically an open-loop card—where an employer loads funds onto the prepaid card and distributes to employees to make business purchases.

Additional forms exist for remittance purposes (a family member in one country loads funds onto the card to be spent by the family in another country), payroll services (the paycheck of an employee is loaded onto the prepaid card instead of going to a bank account), and so on.

Unlike a "credit card", where each purchase draws from a line of credit associated with the card, every purchase authorized by a prepaid card is supported by funds that have been secured by the card's issuer before the purchase is authorized. As such, the risk of non-payment experienced by issuers of credit cards is almost completely avoided by issuers of prepaid cards.

But this safety advantage to prepaid card issuers creates a corresponding disadvantage for prepaid card customers. Specifically, the customer purchasing the prepaid card must "load" funds onto the card before it can be used. Unlike a credit card which can be used to purchase up to a certain limit with the understanding that it will be later repaid, the prepaid card can only be used when funds are loaded onto the card in advance.

This disadvantage is further compounded by the simple fact that the customer of the prepaid card generally does not know at the time funds are loaded on the card, exactly what will be purchased. Accordingly, the customer must typically load onto the card the maximum amount that could conceivably be used, even if that means putting more funds onto the card than will actually be used.

Similarly, a disadvantage of the prepaid model is funds are typically loaded onto the card days, weeks, or months prior to any purchase actually occurring. During this period, those same funds cannot be used for any other purchase, cannot be used for investment purposes, cannot be used to pay off debt, etc.

Finally, the largest disadvantage of the prepaid model is after a purchase is actually made, there are generally funds left on the card. These funds are often insufficient for any significant purchase, and thus are ignored and never actually spent. Unspent funds on prepaid cards are classified as "abandoned" after some period of inactivity (or expiration of the card), and often default to the card issuer or the state—but rarely to the customer who purchased the card or the person who holds it.

It would therefore be desirable to alleviate the disadvantages experienced by prepaid card customers whilst preserving the benefits enjoyed by prepaid card issuers.

Description—FIG. 1

A system in the prior art is illustrated in FIG. 1. The system involves a cardholder 110 interacting with a merchant terminal 120 connected via a network 125 to a merchant gateway 130, which is in turn connected via a network 135 to an authorization switch 140. The system also involves a prepaid card 141, which is managed by the authorization switch 140, held by the cardholder 110, and associated with a prepaid account 142.

Operation—FIG. 2

The manner of operation of the system illustrated in FIG. 1 is illustrated by the flowchart in FIG. 2, and begins with step 201 where cardholder 110 presenting prepaid card 141 to merchant terminal 120, for example by physically swiping the card through a magnetic stripe reader.

In step 202, merchant terminal 120 sends an authorization request via network 125 to merchant gateway 130, which then sends the authorization request via network 135 to authorization switch 140.

In step 203, authorization switch 140 retrieves the prepaid account 142 associated with prepaid card 141, for example from a database. Authorization switch 140 then compares the purchase amount contained in the authorization request with information in the prepaid account one example being the current account balance. If the account balance is at least equal to or less than the purchase amount in the authorization request, authorization switch 140 approves or declines the authorization request, respectively.

In step 204, authorization switch 140 approves the authorization request by responding via network 135 to merchant gateway 130, which in turn responds via network 125 to merchant terminal 120.

In step 205, merchant terminal 120 approves the purchase request of cardholder 110.

Alternatively, in step 206, authorization switch 140 declines the authorization request by responding via network 135 to merchant gateway 130, which in turn responds via network 125 to merchant terminal 120.

In step 207, merchant terminal 120 declines the purchase request of cardholder 110.

SUMMARY OF INVENTION

In accordance with the exemplary embodiment, a system, computer readable medium, and method for a first authorization switch to safely authorize a primary authorization request involving a prepaid card and corresponding prepaid account that lacks adequate funds by loading funds onto the prepaid card "on-demand" by sending a secondary authorization request to a second authorization switch and obtaining a "promise to pay" from a funding account.

An exemplary embodiment includes a method for authorizing a purchase transaction, using a prepaid card, between a cardholder and a funding account, using an intermediate prepaid account, the method comprising: issuing of a prepaid card to a cardholder, wherein said prepaid card comprises a corresponding prepaid account managed by a first authorization switch; associating of a funding account identifier to said prepaid account, wherein said funding account identifier comprises a corresponding funding account managed by a second authorization switch; initiating, by said cardholder, a primary authorization request using said prepaid card; initiating, by said first authorization switch, a secondary authorization request using said funding account identifier; authorizing, by said second authorization switch, said secondary authorization request using said funding account identifier; authorizing, by said first authorization switch, said primary authorization request using the response from said secondary authorization request.

A further exemplary embodiment includes a system for authorizing a purchase transaction, using a prepaid card, between a cardholder and a funding account, using an intermediate prepaid account, said system comprising: a prepaid card held by a cardholder; a first merchant terminal capable of sending a primary authorization request via a network; a first authorization switch; a prepaid account database storing a prepaid account record identified by a prepaid account identifier, whereby said prepaid account identifier is encoded onto said prepaid card; a second merchant terminal capable of sending a secondary authorization request via a network; a second authorization switch; a funding account database storing a funding account record identified by a funding account identifier, whereby said funding account identifier is stored within said prepaid account record; whereby said first merchant terminal retrieves said prepaid account identifier from said prepaid card, and whereby said first merchant terminal sends said primary authorization request comprising said prepaid account identifier to said first authorization switch, and whereby said first authorization switch uses said prepaid account identifier to retrieve said prepaid account record from said prepaid account database, and whereby said first authorization switch retrieves said funding account identifier from said prepaid account record, and whereby said first authorizations switch manipulates said second merchant terminal so as to send said second authorization request comprising said funding account identifier to said second authorization switch, and whereby said second authorization switch uses said funding account identifier from said secondary authorization request to retrieve said funding account record from a database, and whereby said second authorization switch determines from information within said funding account record whether to approve or decline said second authorization request, and whereby said second authorization switch responds to said second merchant terminal, and whereby said second merchant terminal notifies said first authorization switch of said response to said secondary authorization request, and whereby said first authorization switch determines from said response to said secondary authorization request whether to approve or decline said primary authorization request, and whereby said first authorization switch responds to said first merchant terminal.

An exemplary embodiment includes a computer readable medium for authorizing a purchase transaction, the computer readable medium storing instructions comprising: issuing of a prepaid card to a cardholder, wherein said prepaid card comprises a corresponding prepaid account managed by a first authorization switch; associating of a funding account identifier to said prepaid account, wherein said funding account identifier comprises a corresponding funding account managed by a second authorization switch; initiating, by said cardholder, a primary authorization request using said prepaid card; initiating, by said first authorization switch, a secondary authorization request using said funding account identifier; authorizing, by said second authorization switch, said secondary authorization request using said funding account identifier; authorizing, by said first authorization switch, said primary authorization request using the response from said secondary authorization request.

BRIEF DESCRIPTION OF THE DRAWINGS

FIG. 5 illustrates a flowchart of operations involved in the method of performing a chargeback in the exemplary embodiment.

DRAWINGS—REFERENCE NUMERALS

110—Cardholder
120—Merchant terminal
125—Network
130—Merchant gateway
135—Network
140—Authorization switch
141—Prepaid card
142—Prepaid account
310—Cardholder
320—First merchant terminal
325—Network
330—Merchant gateway
335—Network
340—First authorization switch
341—Prepaid card
342—Prepaid account
343—Second merchant terminal
345—Network
350—Merchant gateway
355—Network
360—Second authorization switch
361—Funding account identifier
362—Funding account

DETAILED DESCRIPTION OF THE EXEMPLARY EMBODIMENTS OF THE INVENTION

Hereinafter, the present invention will be described in detail by explaining exemplary embodiments of the invention with reference to the attached drawings.

Figure 1:
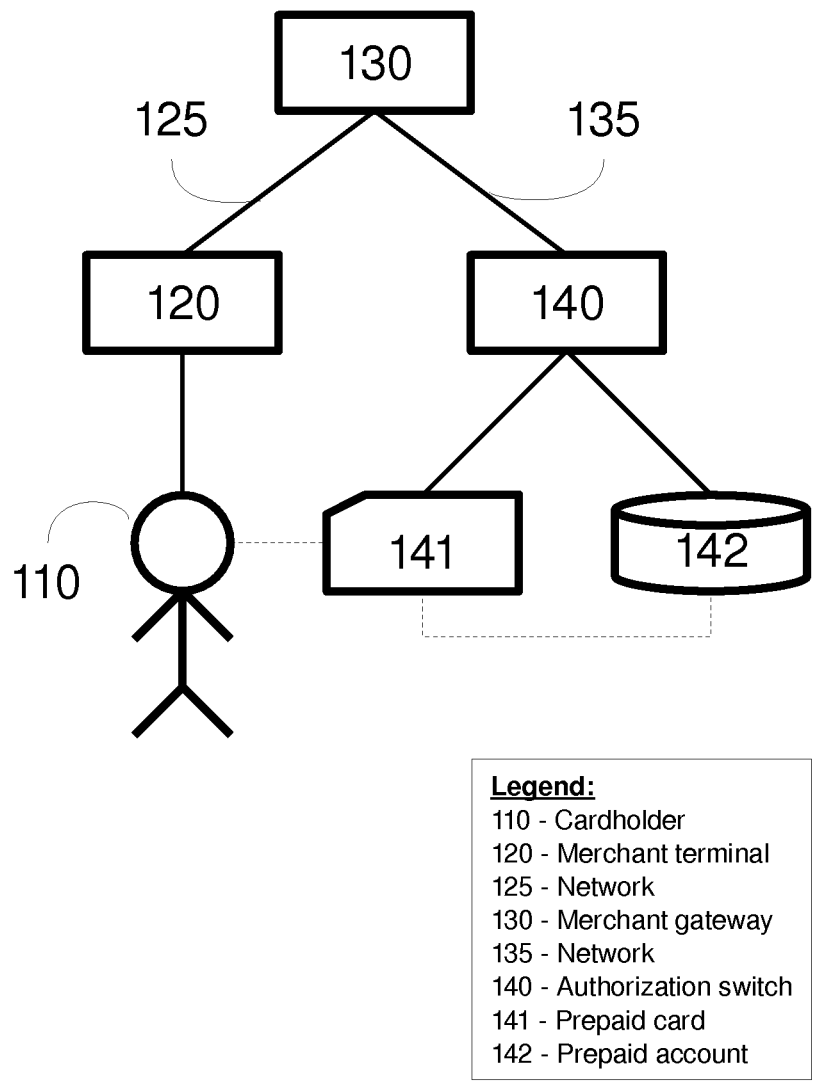
FIG. 1 illustrates a schematic block diagram of the configuration of components involved in a system in the prior art.
Figure 2:
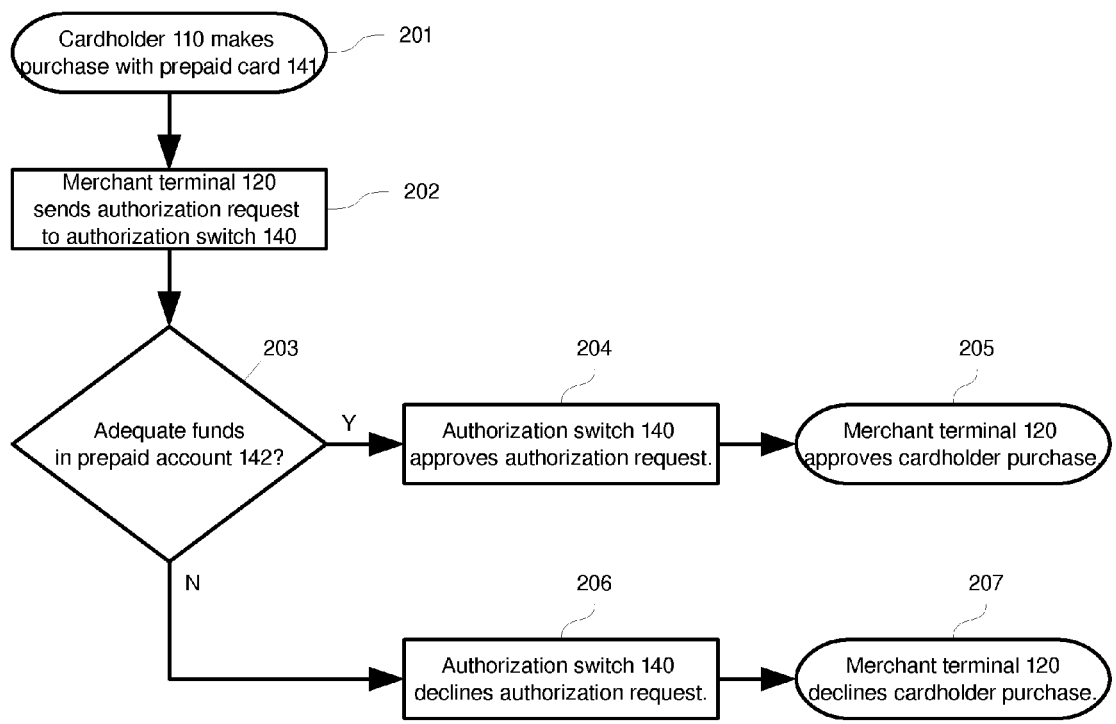
FIG. 2 illustrates a flowchart of operations involved in a method of performing an authorization request in the prior art.
Figure 3:
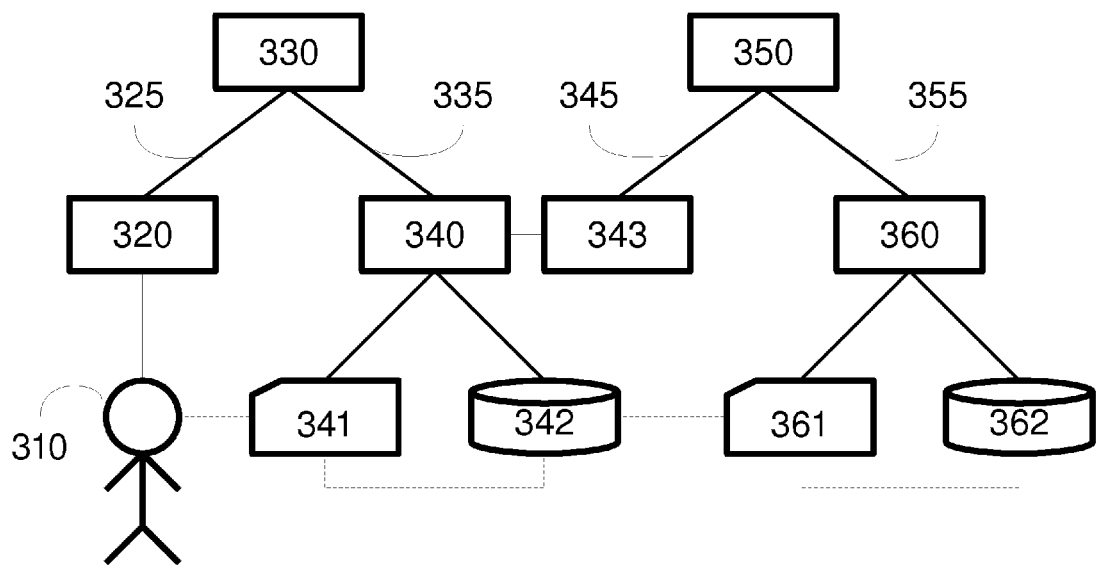
FIG. 3 illustrates a schematic block diagram of the configuration of components involved in the system in the exemplary embodiment of the present invention.

An exemplary embodiment of the system is illustrated in FIG. 3. The system involves a cardholder 310 interfacing with a first merchant terminal 320 connected via network 325 to a merchant gateway 330, which is in turn connected via network 335 to a first authorization switch 340. The system also involves a prepaid card 341, which is managed by authorization switch 340, held by cardholder 310, and associated with prepaid account 342. The system also involves a second merchant terminal 343 connected to the first authorization switch 340, and connected via network 345 to a merchant gateway 350, which is in turn connected via network 355 to a second authorization switch 360. The system also involves a funding account identifier 361, which is managed by authorization switch 360, and associated with both prepaid account 342 and funding account 362.

In the exemplary embodiment, one or more of the networks 325, 335, 345, and 355 are "open loop" financial networks, such as the Visa™, MasterCard™, Discover™, Automated Clearing House (ACH), eCheck™, or IP Commerce Payment Transaction Layer Switching (PTLS). In another embodiment, one or more of the networks are "closed loop" networks, such as the incentive card programs by Starbucks, Safeway, malls, and other merchants or coalitions of merchants. In another embodiment, one or more of the networks are general-purpose networks such as HTTP, FTP, SFTP, email, 802.11 wireless networks, Ethernet, fiberoptic, or internet networks. In the exemplary embodiment, one or more of the merchant gateways 330 and 350 bridge one or more different networks, such as receiving authorization requests over one or more general-purpose networks and sending via one or more dedicated financial networks.

In the exemplary embodiment, one or more of the merchant terminals 320 and 343 are Point of Sale (PoS) terminals in which payment information from an electronic payment card is read by physically "swiping" through a magnetic card reader, scanning with an optical mechanism such as a laser barcode reader, scanning with an electromagnetic system such as Radio Frequency Identifiers (RFID), or manually entering such as with keyboard or touch screen. Examples of such PoS systems include cash registers, card-swipe terminals, and ATMs. In another embodiment, one or more of the merchant terminals 320 and 343 are automated servers in which payment information is submitted electronically via a network, such as in a "mail order telephone order" (MOTO) service or internet merchant service. In the exemplary embodiment, merchant terminal 320 is used at a physical "brick and mortar" merchant establishment, such as a grocery store. In another embodiment, merchant terminal 320 is used at an online service, such as a website.

In the exemplary embodiment, the authorization switches 340 and 360 are computers comprising one or more of a CPU, RAM, hard-drive, and networking card configured in such a fashion as to receive authorization requests from a network, parse the requests to obtain payment information (such as the prepaid card 341 or funding account identifier 361), and use that payment information to retrieve a data record representing one or more of a monetary account at a bank, personal identifying information about the account owner, historical purchase information for that account, preferences of the account holder, and account identifiers of additional sources of funds.

In the exemplary embodiment, prepaid account 342 is a data record stored in one or more of RAM, magnetic disk, or Flash array, and includes a funding account identifier 361 and all corresponding information necessary to initiate an authorization request for funds to be transferred from funding account 362 into prepaid account 342. In the exemplary embodiment, authorization switches 340 and 360 store accounts 342 and 362, respectively, in a database.

In the exemplary embodiment, the authorization switch 340 is configured with the capability to initiate authorization requests via merchant terminal 343. For example, in an exemplary embodiment, authorization switch 340 communicates with merchant terminal 343 over a network, such as a LAN, or the internet. In another embodiment, merchant terminal 343 is combined with prepaid switch 340 on a single computer. In the exemplary embodiment, first authorization switch 340 and second merchant terminal are owned and operated by the same organization, such as a financial institution. In another embodiment, first authorization switch 340 and second merchant terminal 343 are operated by separate organizations, for example by a prepaid card processor and a prepaid card reseller, respectively.

In the exemplary embodiment, cardholder 310 physically holds, for example, a plastic electronic payment card, encoded with information corresponding to prepaid card 341. In another embodiment, cardholder 310 knows enough information about prepaid card 341 to directly supply it to an manual input terminal (such as a keyboard or touch-screen device, or a web-based input form) including one or more of the card's Primary Account Number (PAN), expiration date, associated billing address, card security code (CSC), card verification value (CVV), card verification value code (CVVC), card verification code (CVC), verification code (V-Code), and personal identification number (PIN).

In the exemplary embodiment, authorization switch 340 is operated by the same financial institution (or partners) that issues prepaid card 341 and manages prepaid account 342. Also, in the exemplary embodiment, authorization switch 360 is operated by the same financial institution (or partners) that issues funding account identifier 361 and manages funding account 362. In the exemplary embodiment, these financial institutions are banks.

In the exemplary embodiment, prepaid account 342 is a prepaid or "stored value" account. In another embodiment, prepaid account 342 is a line of credit (in which prepaid card 341 is actually a credit card). In the exemplary embodiment, funding account identifier 361 is a checking account number and funding account 362 is a checking account. In another embodiment, funding account identifier 361 is a credit card number and funding account 362 is a line of credit. In the exemplary embodiment, both prepaid account 342 and funding account 362 store value in the same currency (e.g., USD). In another embodiment, prepaid account 342 and funding account 362 store value in different currencies, and a currency exchange is preformed between the two.

In the exemplary embodiment, one entity has legal ownership over both the prepaid account 342 and funding account 362, where the cardholder funds his prepaid card with his own account. In an alternate embodiment, prepaid account 342 and funding account 362 are legally owned by different entities, where the prepaid card is held by one entity (e.g., an employee) but funded by another entity (e.g., an employer).

Figure 4:
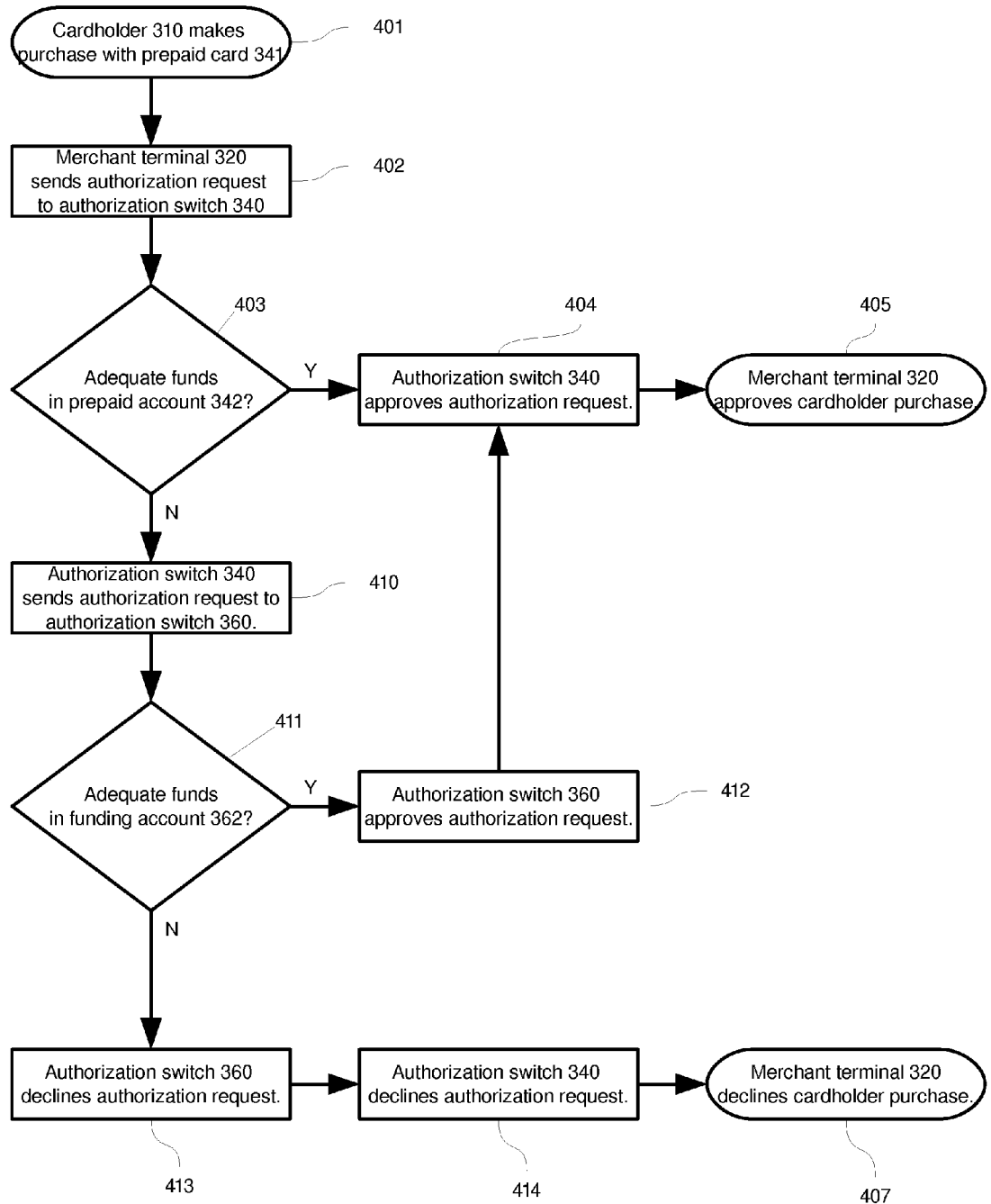
FIG. 4 illustrates a flowchart of operations involved in the method of performing an authorization request in the exemplary embodiment.

Operation—FIG. 4

The manner of executing the system in FIG. 3 is illustrated by the flowchart in FIG. 4, and starts with step 401, where cardholder 310 presents prepaid card 341 (or presents the information contained on the card) to merchant terminal 320 as means of payment for a given purchase.

In step 402, merchant terminal 320 generates a primary authorization request including at least information from prepaid card 341 and the amount of the payment, and sends this primary authorization request via network 325 to merchant gateway 330. Merchant gateway 330 uses the information stored in the primary authorization request (such as the BIN of the prepaid card 341) to determine which network 335 is relevant to this request. Merchant gateway 330 then dispatches the primary authorization request via network 335 to authorization switch 340.

In the exemplary embodiment, in step 403 the first authorization switch 340 uses the information stored in the primary authorization request (such as the prepaid card 341) to retrieve the prepaid account 342 from a database. In the exemplary embodiment, prepaid account 342 includes one or more of a current account balance, user preferences of the account holder, and funding account identifier 361. In the exemplary embodiment, if there are adequate funds in prepaid account 342 to compensate the purchase amount specified in the primary authorization request, authorizations switch 340 immediately responds with approval to the primary authorization request via network 335, as described in step 404.

However, if instead the funds in prepaid account 342 are inadequate to compensate the purchase amount, in the exemplary embodiment authorization switch 340 initiates a secondary authorization as described in step 410.

In step 410, authorization switch 340 initiates a secondary authorization request via merchant terminal 343 to obtain payment or a "promise to pay" from funding account 362 using funding account identifier 361. In an exemplary embodiment, the second authorization switch commits to transfer funds from the funding account 362 into the prepaid account 342 within a certain timeframe, such as 2-3 business days. In another embodiment, the payment funds are immediately transferred from funding account 362 to prepaid account 342.

In an alternate embodiment, user preferences stored in prepaid account 342 regulate the determination as to whether to initiate a secondary authorization request or instead immediately decline the primary authorization request and thereby terminate the purchase. In another embodiment, authorization switch 340 uses information in the primary authorization request and prepaid account 342 to decline the primary authorization request even if adequate funds are available, such as to enforce purchase policies or budget restrictions (e.g., to decline purchases from certain merchants, with certain amounts, at certain times or days, from certain geographic locations, with certain keywords appearing in the authorization request, etc). In another embodiment authorization switch 340 both immediately approves the primary authorization request and initiates a secondary authorization transaction, such as to trigger a "re-loading" operation on the prepaid card to replace the funds that are being spent on the current purchase. In another embodiment, the authorization switch 340 triggers additional operations at the time of receiving the authorization request, such as inserting data into a database, or sending an email or SMS message.

In the exemplary embodiment, authorization switch 340 explicitly initiates a secondary authorization request by notifying the second merchant terminal 343 directly. This is called a "push" operation. In another embodiment, authorization switch 340 implicitly initiates a secondary authorization request by waiting for second merchant terminal 343 to request a list of new primary authorization requests. This is called a "pull" or "polling" operation. In one embodiment, second merchant terminal 343 polls first authorization switch 340 for new authorization requests daily, nightly, hourly, or on some other regular frequency. In another embodiment, it polls at an irregular frequency, or when triggered by an outside event.

In one embodiment, merchant terminal 343 monitors authorization switch 340 by regularly polling to discover new primary authorization requests, and then automatically bills funding account 362 for the necessary amount to "top off" the prepaid card by reloading it back up to some predetermined amount, such as an amount recorded in prepaid account 342. In this embodiment, the customer (e.g., owner of the funding account) specifies a "budget" for the prepaid card and authorizes the authorization switch to automatically bill the customer after each purchase for the amount of the purchase (plus a surcharge) in order to reload the card back up to the budget amount. In an exemplary embodiment, the top-off billing is completely automatic and occurs with no human intervention. In another embodiment, the billing occurs only after the customer or cardholder or other authorized entity manually confirms the top-off operation.

If authorization switch 340 initiates a secondary authorization request in step 410, merchant terminal 343 sends a secondary authorization request via network 345 that includes funding account identifier 361 and a secondary purchase amount. In the exemplary embodiment, the purchase amount of the secondary authorization request is greater than or equal to the amount of the primary authorization request. In another embodiment, the purchase amount of the secondary authorization request is less than the purchase amount in the primary authorization request. In another embodiment, the purchase amount of the secondary authorization request is in a different currency than the purchase amount in the primary authorization request. In another embodiment, the first authorizations switch 340 uses information in the primary authorization request and prepaid account 342 to issue two or more secondary authorization requests using one or more funding account identifiers, such as to split the purchase amount between multiple funding accounts or to direct certain types of purchases to certain funding accounts.

In step 410, merchant gateway 350 uses the information stored in the secondary authorization request (such as funding account identifier 361) to determine which network 355 is relevant to this request. Merchant gateway 350 then dispatches the secondary authorization request via network 355 to authorization switch 360.

In step 411, in the exemplary embodiment the second authorization switch 360 uses the information stored in the secondary authorization request (such as the funding account identifier 361) to retrieve funding account 362 from a database. In the exemplary embodiment, funding account 362 includes a current account balance. In the exemplary embodiment, if there are adequate funds in funding account 362 to compensate the purchase amount of the secondary authorization request, authorization switch 360 approves the secondary authorization request via network 355. Similarly, in the exemplary embodiment, if there are inadequate funds in funding account 362 to compensate the purchase amount of the secondary authorization request, authorization switch 360 declines the secondary authorization request via network 355. In an alternate embodiment, rather than decline the secondary authorization request, authorization switch 360 generates a ternary authorization request via another merchant terminal.

When the second authorization switch responds to the secondary authorization request via network 355 (whether approved as in step 412 or declined as in step 413), merchant gateway 350 uses information in the response (such as the funding account identifier 361) to determine which network is relevant to the response. Merchant gateway 350 then dispatches the secondary authorization response via network 345 to merchant terminal 343, which then returns the secondary authorization response to the first authorization switch 340.

In the exemplary embodiment, upon receiving a response to the secondary authorization request from merchant terminal 343, first authorization switch 340 approves or declines the primary authorization request via network 335 depending on whether the secondary authorization request was approved or declined, respectively. In another embodiment, the authorization switch 340 triggers additional operations at the time of sending the authorization response, such as inserting data into a database, or sending an email or SMS message.

When the first authorization switch responds to the primary authorization request via network 335 (whether approved as in step 404 or declined as in step 414), merchant gateway 330 uses information in the response (such as the prepaid account identifier 341) to determine which network is relevant to the response. Merchant gateway 330 then dispatches the primary authorization response via network 325 to merchant terminal 320. Merchant terminal 320 then returns the primary authorization response to the cardholder, and either approves the purchase request as in step 405 or declines the purchase request as in step 407, thereby completing the purchase transaction.

Operation of Alternate Embodiment—Increments, Reversals, Voids, and Returns.

Authorization requests are just one several types of transactions, others including increments, reversals, voids, and returns. In all cases, direct equivalents exist to apply the system, computer readable medium, and method of the present invention to these other transaction types.

Accordingly, in another exemplary embodiment, the primary and secondary authorization requests are instead replaced with primary and secondary increment requests, respectively. In this embodiment the merchant terminal is requesting authorization to increase a previous authorization. This primary increment request is transmitted and processed according to the present invention, with the primary increment request being initiated by the cardholder 310 via merchant terminal 320, sent via network 325 to merchant gateway 330, sent via network 335 to first authorization switch 340, which determines using information in prepaid card 341 and prepaid account 342 whether to approve or decline immediately or initiate a secondary increment request via merchant terminal 343, send the secondary increment request via network 345 to merchant gateway 350, send via network 355 to the second authorization switch 360 which determines whether to approve or decline the increment using information in the funding account identifier 361 and funding account 362, and finally send the response back via network 355 through merchant gateway 350, network 345, merchant terminal 343, authorization switch 340, network 335, merchant gateway 330, network 325, merchant terminal 320, and ultimately back to the cardholder 310 in the form of an approved or rejected purchase adjustment. Additional embodiments exist as direct parallels for reversals (where a portion of a previously approved authorization is being returned), voids (where an unsettled transaction is canceled in entirety), and returns (where a previously settled transaction is being refunded).

Operation of Alternate Embodiment—Chargebacks

Another type of transaction commonly found in financial network is the chargeback. Exemplary embodiments exists where the system, computer readable medium, and method of the present invention is essentially conducted in "reverse", where the transaction is not initiated by the cardholder 310, but rather initiated by the owner of funding account 362. This reverse method is illustrated in FIG. 5.

The manner of executing the system in FIG. 3 in reverse to process a chargeback transaction is illustrated by the flowchart in FIG. 5, and starts with step 501 where the owner of funding account 362 notifies second authorization switch 360 that a particular purchase is being disputed.

In step 501, authorization switch 360 initiates a primary chargeback via network 355 to merchant gateway 350, which in turn communicates the primary chargeback via network 345 to second merchant terminal 343. Included with this primary chargeback is evidence including, for example, a signed statement by the cardholder that the purchase is fraudulent, evidence that the cardholder was physically elsewhere when the purchase was made, etc.

In step 502, merchant terminal 342 notifies first authorization switch 340 that one of its secondary authorization requests is being disputed by the owner of funding account 362. This causes first authorization switch to in turn dispute the primary authorization request that caused it to initiate the secondary authorization request, by initiating a secondary chargeback via network 335 to merchant gateway 330, which in turn communicates the secondary chargeback via network 325 to merchant terminal 320. Included with this secondary chargeback is evidence including, for example, transaction logs proving that the primary authorization request was in fact received, that ample balance in the prepaid card account 342 was not available, etc.

In step 503, merchant terminal 320 responds to the secondary chargeback via network 325 to merchant gateway 330 with evidence justifying that the purchase was legitimate. This evidence can for example be a photocopy of a signed receipt, proof that the AVS code was properly received, camera footage of the cardholder making the purchase, etc.

In step 504, merchant gateway 330 determines, in conjunction with for example Visa or MasterCard, whether merchant terminal 320 or first authorization switch 340 has offered a stronger case as to whether the purchase is legitimate or illegitimate, and communicates the decision to the secondary chargeback via networks 325 and 335 to merchant terminal 320 and first authorization switch 340, respectively.

In step 505, first authorization switch 340 provides the result of the secondary chargeback decision by merchant gateway 330 as evidence to merchant terminal 343, which in turn communicates this evidence via network 345 to merchant gateway 350.

In step 506, merchant gateway 350 determines, in conjunction with for example Visa or MasterCard, whether merchant terminal 343 or second authorization switch 360 has offered a stronger case as to whether the purchase is legitimate or illegitimate, and communicates the decision of the primary chargeback via network 345 and 355 to merchant terminal 343 and second authorization switch 360, respectively.

In one such embodiment, given the less automated nature of chargebacks, one or more of networks 325, 335, 345, and 355 are telephone, fax, email, internet, Federal Express, UPS, and the US Postal Service.

A key advantage of the exemplary embodiment over the prior art is the use of the response of the secondary chargeback as evidence to defend against the primary chargeback. In the prior art, making a purchase with the prepaid card and loading funds onto the card are two distinct and unrelated actions: when faced with a chargeback claim from a customer, the prepaid card issuer has only internal records that the customer requested the funds be reloaded, and these records might be subject to dispute.

Conceivably, in the prior art a cardholder could successfully dispute loading funds onto the card by challenging the record that such a load was requested. This dispute could stand despite the customer admitting to have used the prepaid card to make a purchase—essentially saying "yes, I kept using the card with the understanding that it would stop working when the funds I loaded ran out; it's not my fault you incorrectly billed me and put extra funds onto the card." In this scenario, the prepaid card vendor has no choice but to reimburse the customer without being able to obtain compensation from the vendor.

In the exemplary embodiment, however, funds are reloaded onto the prepaid in line with or in response to a purchase being made with the prepaid card. Because the record of a customer making a purchase with a prepaid card is very reliable (with the merchant bank and network being able to confirm the transaction did in fact take place), by creating clear terms of service to which the customer must agree to follow (such as by including a printed copy with the physical mailing of the card itself, as well as requiring the customer to agree to the terms when activating the card), the prepaid issuer can demonstrate that the cardholder has pre-authorize billing in response to a valid prepaid card purchase and thereby protect itself against a class of chargebacks that might otherwise leave it vulnerable.

For example, in the above scenario where the customer admits to making the purchase but disputes being billed, the prepaid issuer would simply point to the terms of service that enable it to bill the customer in response to any non-fraudulent purchase. The result is the cardholder can only dispute billing from the prepaid card if in fact the purchase that triggered the billing is deemed fraudulent (e.g., with a stolen prepaid card). But in this situation the merchant must reimburse the prepaid issuer, and thus once again, the prepaid issuer is protected against reimbursing the customer without itself being reimbursed by the merchant.

From the description above, a number of exemplary benefits of exemplary embodiments of the system, computer readable medium, and method of the present invention become evident, including but not limited to:

(a) By initiating a secondary authorization request, a prepaid card issuer can optionally authorize purchases despite inadequate funds being present on the card, but without the corresponding risk of a credit card as the "promise to pay" returned by the funding account is as reliable as cash. Accordingly, every purchase with the prepaid card is still "prepaid" in the sense the issuer is extending no credit to the cardholder. However, the cardholder enjoys the benefit of not needing to explicitly load funds onto the card in advance of the purchase. Rather, funds are loaded onto the card "on-demand", inline with the purchase transaction itself.

(b) By placing a prepaid card "between" the merchant and a funding account, the issuer of the prepaid card has a low-risk, low-cost platform to gather detailed information about the cardholder purchases without requiring the customer to switch banks or apply for a new line of credit. Rather, the prepaid issuer can safely issue a prepaid card to the cardholder that is "funded" by whichever credit card or checking account the customer normally uses for purchases. The only behavioral change required by the cardholder is they make purchases with the new prepaid card rather than their typical card. Once done, the prepaid issuer is able to seamlessly intercept and log all purchases made by the customer, enabling the issuer to offer value-added services that use this data. But because all purchases are individually billed back to the customer's regular credit card or checking account, the customer is not sent a new monthly bill and doesn't need to alter habits around financial planning.

(c) Because the prepaid card intercepts all authorization requests destined for the funding account, the prepaid card can apply "filtering" rules to optionally decline transactions based on merchant name, industry code, transaction time, purchase amount, and so on. One use of this is to enable the cardholder to set budget rules and purchase policies that are explicitly enforced by the card, as a way of eliminating the temptation to violate these rules. However, the party who funds the card needn't be the party who holds the card. In this case, an employer could issue to all employees prepaid cards that are centrally funded by the company. The company could then set per-card purchase policies and budgets that are enforced by the prepaid card, even when the funding account would otherwise authorize the purchase.

(d) Furthermore, the prepaid card could have multiple funding accounts associated with it, with rules for allocating or splitting purchases between those accounts. For example, a small business with two owners who agree to split all business purchases could create a prepaid card configured to bill each funding account for half of the prepaid purchase, thereby implicitly enforcing the business agreement in place.

(e) Similarly, the prepaid card could consolidate multiple funding accounts. For example, if a cardholder has both a credit card and a checking account, the prepaid card could be configured to first attempt to bill the checking account direct and—failing that—bill the credit card. Or the prepaid card could consolidate multiple credit cards into a single "virtual credit card" with a credit limit equal to the sum of all cards.

(f) The most common prepaid product is the "gift card"— where rather than giving cash you instead give a prepaid card. One downside of this product is the gift giver must spend cash up front to get the card, even if the card itself isn't fully used, is never used, or is even lost. With an "on-demand prepaid" card the gift-giver only pays when the recipient actually uses the card.

(g) On top of all these benefits, the issuer of the prepaid card is protected from "chargebacks" where the owner of the funding account disputes a secondary authorization request. Whether the networks determine the funding account owner or merchant should pay, in all cases the prepaid issuer is protected.

CONCLUSIONS, RAMIFICATIONS, AND SCOPE

Accordingly, this system, computer readable medium, and method of loading prepaid cards with funds "on-demand" maintains the benefits prepaid cards offer issuers while reducing the disadvantages experienced by the customer. Furthermore the system has the additional benefits in that:

it permits prepaid cards to be loaded only when and with the precise amount necessary to support a given purchase, rather than speculatively before the purchase has been decided;

it provides a low-risk, low-cost platform for providers of value-added data services to sit between existing merchants and funding accounts and gather data;

it enables purchase-policy and budget filters to be layered atop existing funding accounts for proactive enforcement (rather than reactive correction);

it enables purchases to be routed to and split between funding accounts using arbitrary rule sets specified by the card issuer, fund owner, and cardholder;

Although the description above contains many specificities, these should not be construed as limited the scope of the embodiments but as merely providing illustrations of some of the presently exemplary embodiments. Thus the scope of the embodiments should be determined by the appended claims and their legal equivalents, rather than by the examples given above.

What is claimed is:

1. A method for conducting financial network electronic transactions, the method including one or more steps that are performed by one or more processors over a network, the method comprising:
   (a) associating a prepaid account with a first entity, wherein information related to the prepaid account is stored on a database accessible via the network;
   (b) linking a prepaid card to the prepaid account of the first entity and making the prepaid card available for use by the first entity in connection with a plurality of rules specified by a second entity, wherein the plurality of rules are stored on the database accessible via the network and include a first set of rules that specify a merchant and a particular geographic location where the prepaid card can be used;
   (c) responsive to a notification of a transaction from the first entity, processing a primary authorization request when the prepaid card of the first entity is used at a merchant terminal of the merchant in accordance with the plurality of rules specified by the second entity, including loading a funds for the transaction into the prepaid account of the prepaid card when the transaction is in accordance with the plurality of rules;
   (d) initiating two or more secondary authorization requests to automatically divide the funds for the transaction among multiple funding accounts in accordance with a second set of rules of the plurality of rules.

2. The method according to claim 1, wherein at least (c) and (d) are performed over an "open loop" network comprising at least one of VisaNet, MasterCard, Discover, Automated Clearing House, or American Express.

3. The method according to claim 1, wherein at least (c) and (d) are performed over a "closed loop" network tied to an individual merchant, or coalition of merchants.

4. A system, comprising:
   one or more processors; and
   a memory operatively coupled to the one or more processors, the memory for storing instructions, which when executed by the one or more processors over a network, cause the one or more processors to:
      associate a prepaid account with a first entity, wherein information related to the prepaid account is stored on a database accessible via the network;
      link a prepaid card to the prepaid account of the first entity and make the prepaid card available for use by the first entity in connection with a plurality of rules specified by a second entity, wherein the plurality of rules are stored on the database accessible via the network and include a first set of rules that specify a merchant and a particular geographic location where the prepaid card can be used;
      responsive to a notification of a transaction from the first entity, process a primary authorization request when the prepaid card of the first entity is used at a merchant terminal of the merchant for the transaction in accordance with the plurality of rules specified by the second entity;
      wherein processing the primary authorization request includes loading the prepaid account of the prepaid card with funds for the transaction;
      initiate two or more secondary authorization requests to automatically divide the funds for the transaction among multiple funding accounts in accordance with a second set of rules of the plurality of rules.

5. The method of claim 1, wherein the plurality of rules specified by the second entity include a rule to limit transactions based on an amount of a given transaction.

6. The method of claim 1, wherein (d) includes using multiple funding accounts of the second entity to fund the prepaid account of the first entity.

7. The system of claim 4, wherein the plurality of rules specified by the second entity include a rule to limit transactions based on an amount of a given transaction.

8. The system of claim 4, wherein the one or more processors initiate at least one of the secondary authorization requests by obtaining funds from multiple funding accounts of the second entity to fund the prepaid account of the first entity.

* * * * *